(12) United States Patent
Kato et al.

(10) Patent No.: US 6,344,629 B1
(45) Date of Patent: Feb. 5, 2002

(54) APPARATUS FOR ASSEMBLING VEHICLE BODY

(75) Inventors: Chitoshi Kato, Saitama-ken; Masayuki Fukumori, Tochigi-ken; Teiji Miwa, Saitama-ken; Kenji Kusumegi, Saitama-ken; Nagahisa Kitamura, Saitama-ken; Masashi Koike, Saitama-ken; Masaaki Tanaka, Saitama-ken, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,750

(22) Filed: Aug. 24, 2000

(30) Foreign Application Priority Data

| Aug. 27, 1999 | (JP) | ............................................. | 11-242121 |
| Aug. 27, 1999 | (JP) | ............................................. | 11-242122 |
| Aug. 27, 1999 | (JP) | ............................................. | 11-242123 |
| Aug. 27, 1999 | (JP) | ............................................. | 11-242124 |

(51) Int. Cl.$^7$ ............................................. B23K 11/36
(52) U.S. Cl. ........................ 219/148; 218/147; 228/48
(58) Field of Search ................................ 219/147, 148; 228/48

(56) References Cited

U.S. PATENT DOCUMENTS

| 4,121,084 A | * | 10/1978 | Wear |
| 4,441,645 A | * | 4/1984 | Takagishi et al. |
| 4,448,341 A | * | 5/1984 | Fujikawa et al. |
| 5,191,707 A | * | 3/1993 | Sasamoto et al. |
| 5,548,096 A | * | 8/1996 | Akasaka et al. |
| 5,932,117 A | * | 8/1999 | Johnson et al. |
| 6,070,781 A | * | 6/2000 | Johnson et al. |
| 6,100,497 A | * | 8/2000 | Maruyama et al. |
| 6,138,889 A | * | 10/2000 | Campani et al. |
| 6,173,881 B1 | * | 1/2001 | Sloan et al. |

FOREIGN PATENT DOCUMENTS

| JP | 63-53073 | 10/1988 |

* cited by examiner

*Primary Examiner*—Tom Dunn
*Assistant Examiner*—Colleen Cooke
(74) *Attorney, Agent, or Firm*—Armstrong, Westerman, Hattori, McLeland & Naughton, LLP

(57) ABSTRACT

On a setting cart which is movable back and forth between a setting station and a vehicle body assembly station, there are provided floor panel setting members, side sill receiving members and side panel forcing members which force side panels toward a floor panel from a lateral outward. In the setting station, the floor panel and the side panels which are set in position on the setting cart are transferred to a jig which is disposed in a side portion of the vehicle body assembly station. The side panels are welded to the floor panel by welding robots which are disposed at a level below the jig. In the above-described arrangement, the side sill receiving members and the side panel forcing members are set on the setting cart so as to be retractable into shunted positions free from interference with the welding robots in welding operation. The welding work by the welding robots can thus be started without waiting for the returning of the setting cart to the setting station.

5 Claims, 16 Drawing Sheets

APPARATUS FOR ASSEMBLING VEHICLE BODY

BACKGROUND OF THE INVENTION

1. Field of the Invention

The present invention relates to an apparatus for assembling a vehicle body, in which at least left and right side panels and a floor panel, out of all constituting members of the vehicle body, are combined by welding to thereby assemble the vehicle body.

2. Description of Related Art

As this kind of apparatus for assembling a vehicle body, there has hitherto been known the following one in Japanese Published Examined Patent Application No. 53073/1988. Namely, the apparatus comprises: a setting cart which is movable back and forth between a setting station and a vehicle body assembly station; and a jig which is mounted, in an inward-looking posture as seen laterally (i.e., from left or right), on a supporting base which is disposed on each of left and right outside portions of the vehicle body assembly station. The setting cart is provided with: floor panel supporting members for positioning and supporting a floor panel of the vehicle body; side sill receiving members for receiving left and right side sill portions which are defined as combined portions between the floor panel and the left and right side panels of the vehicle body; and side panel forcing members for forcing both the side panels from a lateral outside toward the floor panel. The floor panel and both the side panels are set in position onto the setting cart in the setting station and are transported to the vehicle body assembly station. In the vehicle body assembly station, each of the side panels on the setting bogy are received in a state of being combined to the floor panel by means of the jigs. In this state, each of the side panels is combined by welding to the floor panel to thereby assemble the vehicle body. In this apparatus, a plurality of welding guns are mounted on the jig, and the side panels are combined by welding to the floor panel by means of these welding guns.

The jig is specialized (or specially prepared) for each kind of the vehicle. If the welding guns are mounted on the jig as in the above-described conventional apparatus, the jig becomes higher in cost. If this kind of expensive jig must be prepared for each kind of the vehicle, the equipment cost becomes large.

In this case, the following arrangement is considered. Namely, on each lateral (left and right) side portions of the vehicle body assembly station, a plurality of welding robots are provided at a level below each of the jigs. Each of the side panels is thus combined by welding to the floor panel by means of these welding robots. In this arrangement, it is not necessary to mount the welding guns on the jig and, therefore, the equipment cost can be kept low.

However, if the welding robots are disposed in a manner as described above, during the welding work by the welding robots, the side sill receiving members and the side panel forcing members which are provided on the setting cart interfere with the welding robots. Therefore, the setting cart cannot be returned to the setting position. It follows that, after the side panels and the floor panel are received by the jig, the setting cart must be returned to the setting position first and, thereafter, the welding work by the welding robots must be started. The time required to return the setting cart to the setting position thus becomes a loss time, with the result that the cycle time becomes longer.

In view of the above points, the present invention has an object of providing an apparatus for assembling a vehicle body in which the welding work by welding robots can be started without waiting for the returning of the setting cart back to the setting station, whereby the cycle time can be shortened.

SUMMARY OF THE INVENTION

In order to attain the above and other objects, the present invention is an apparatus for assembling a vehicle body comprising: a setting cart movable back and forth between a setting station and a vehicle body assembly station; a jig mounted on a supporting base in a posture to look laterally inward, the supporting base being disposed on each laterally outside portion of the vehicle body assembly station; the setting cart having: floor panel supporting members for positioning and supporting a floor panel of the vehicle body; side sill receiving members for receiving side sill portions which are defined as combined portions between the floor panel and left and right side panels; and side panel forcing members for forcing each of the side panels from a lateral outside toward the floor panel; wherein the floor panel and both the side panels are set onto the setting cart in the setting station and are transported to the vehicle body assembly station, wherein each of the side panels is received in the vehicle body assembly station in a state of being combined with the floor panel by each of the jigs and wherein, in this state, each of the side panels is combined by welding to the floor panel to thereby assemble the vehicle body; a plurality of welding robots for combining by welding each of the side panels to the floor panel, the welding robots being disposed on each of the lateral sides of the vehicle body assembly station at a level below each of said jigs; wherein the side sill receiving members and the side panel forcing members are disposed on the setting cart so as to be retractable into shunted positions free from interference with the welding robots in welding operation.

According to the present invention, even if the welding work on the side panels and the floor panel by the welding robots is started immediately after the side panels on the setting cart are received by the jig in a state of being combined with the floor panel, the setting jig can be returned to the setting station without interference with the welding robots, if the side sill receiving members and the side panel forcing members are retracted into the shunted (or withdrawn) positions. In this manner, the welding work by the welding robots can be started without waiting for the returning of the setting cart back to the setting station. As a result, the cycle time can be shortened and the productivity can be improved.

Preferably, the apparatus further comprises a longitudinally elongated stationary frame positioned at a level below each of the jigs and the welding robots are mounted on the stationary frames so as to be longitudinally movable. Then, each of the robots can be made smaller in size and the welding of a plurality of longitudinal points can be done by each of the welding robots. Here, in the conventional apparatus for assembling a vehicle body, that supporting base for the jig which is disposed on each of the lateral sides of the vehicle body assembly station is formed into a longitudinally elongated rectangle in which the longitudinal length of an upper portion for mounting thereon the jig and the longitudinal length of a lower portion thereof are made equal to each other. If this kind of supporting base is used, all of the welding robots to be mounted on the stationary frame will lie behind the supporting base as seen from a lateral outside. Maintenance work such as electrode tip dressing of the welding guns to be mounted on the welding robots is performed by a worker who must enter into a space between the stationary frame and the supporting base. However, since this space is considerably small, the workability is poor, the load on the worker becomes heavy, and the work takes much time. This is a problem in improving the productivity. As a solution, the apparatus preferably comprises a supporting base formed into a T-configuration in which a longitudinal length of a lower portion thereof is smaller than a longitudinal length of an upper portion thereof for mounting thereon the jig, such that an open space which extends to the stationary frame is secured in a front and a rear at a lower portion of the supporting base. According to this arrangement, by gathering the welding robots on the stationary frame in those front portion and the rear portion of the stationary frame which face the open space in the lower front portion and the lower rear portion of the supporting base, the maintenance work of all the welding robots can be performed in the open spaces with a good workability. In this manner, the load on the worker in the maintenance work can be reduced and the working time can be shortened, resulting in the improvement in the productivity.

Further, in the above-described conventional apparatus for assembling the vehicle body, a drop lifter type of side panel setting device and a crane type of roof panel setting device are disposed in the setting station. After setting the floor panel on the setting cart, the side panels and the roof panel are set in position onto the setting cart by means of these setting devices. This conventional apparatus, however, has the following disadvantages. Namely, the side panel setting device and the roof panel setting device become large in size and scale. As a result, the space efficiency becomes poor and the freedom in the movement of the setting devices becomes smaller. Therefore, the position of feeding the side panels and the roof panel into the setting devices is limited and, consequently, the freedom of design in the distribution of the side panels and the roof panel is limited.

In this case, if the following arrangement is employed, the space efficiency is improved and the freedom of design in the distribution of the side panels and the roof panel increases. Namely, a setting robot made up of an articulated type of robot for the side panels is disposed on each lateral outside of the setting station, and a setting robot made up of an articulated type of robot for the roof panel is disposed on one lateral outside of the setting station in close proximity to the setting robot for the side panels. The side panels and the roof panel are thus set onto the setting cart by these setting robots.

Depending on the kind of the vehicle, there is sometimes employed the following way. Namely, that rear cross member such as a rear tray, rear roof rail, or the like which is laterally disposed in the rear portion of the vehicle body is not pre-assembled to the roof panel and the floor panel, but is set onto the setting cart as an independent member in the same manner as the side panels and the roof panel. In such a case, it is considered to provide a setting robot which is used exclusively for the rear cross member. This arrangement, however, becomes expensive. As a solution, preferably, the apparatus further comprises: a first setting robot made up of an articulated type of robot disposed on each of the lateral sides of the setting station to thereby set in position each of the side panels onto the setting cart by the first setting robot; a second setting robot made up of an articulated type of robot disposed on an outside of one of the lateral sides at a rear end of the vehicle body in the setting station; a roof panel holding device mounted on an operating end of the second setting robot; a rear cross member holding device mounted on a backside of the roof panel holding device at that end of the roof panel holding device which lies near a front end of the roof panel such that a lower surface of the rear cross member looks forward of the roof panel; wherein the rear cross member is set in that erected posture of the roof panel holding device in which the rear cross member holding device looks downward and wherein the roof panel is set in a horizontal posture of said roof panel holding device. According to this arrangement, when the roof holding device is made into the above-described erected posture by the operation of the second setting robot, the roof panel to be held by the roof panel holding device is erected in a position offset behind the rear of the vehicle body as compared with the rear cross member to be held by the rear cross member holding device. In this manner, the rear cross member can be set in a predetermined setting position in the rear of the vehicle body without interference of the roof panel with the side panels to be set by the first setting robot onto the setting cart. Then, while changing the posture of the roof panel holding device to a horizontal posture, the roof panel holding device is moved to an upper position between the left and right side panels. The roof panel is then set to a position between the upper edges of both the side panels. In this manner, the setting work of the rear cross member and the roof panel can be efficiently made in a continuous manner by means of the second setting robot. As compared with an arrangement in which separate setting robots are provided for the roof panel and for the cross member, respectively, the present apparatus can reduce the equipment cost.

The above-described jig is prepared for an exclusive use for each kind of the vehicle. Therefore, the jig must be exchanged or replaced whenever the kind of the vehicle is changed. As a jig exchanging device, there has hitherto been disclosed the following in Japanese Published Examined Patent Application No. 19756/1990. Namely, an apparatus frame which has a lifting space for vertically moving therein a jig is vertically provided in close proximity to one of front and rear positions in which a supporting base is disposed. Inside the lifting space, there is disposed a receiving base which receives the jig in an upward-looking posture, the receiving base being disposed in two vertical (upper and lower) stages by being supported by a lifting base which moves vertically inside the apparatus frame. When the supporting base is rotated into a phase in which the jig looks upward, the jig is exchangeable between the supporting base and the receiving base which is on the same exchanging level as the supporting base. According to this arrangement, the used jig which is mounted on the supporting base is changed into the upward-looking posture and, then, the used jig is transferred to either the upper or lower receiving base which is in the exchange position. Thereafter, the other of the receiving bases is moved to the exchange position. That jig for the next kind of the vehicle which is mounted in advance on this receiving base is transferred to the supporting base, whereby the jig exchanging can be performed. In this arrangement, however, in exchanging the jig, the jig must be made into the upward-looking posture by the rotation of the supporting base. It follows that the supporting base must be made rotatable, resulting in a higher cost. Therefore, in order to enable the jig to be quickly exchangeable while the jig is in an inward-looking posture, it is preferable to make the following arrangement. Namely, the apparatus further comprises: a supporting frame provided on the supporting base such that the jig is movable back and forth in an inward-looking posture; a jig replacing device disposed adjacent to one of the longitudinal sides of the supporting base, the jig replacing device having a rotary member which is rotatable about a longitudinal axis; a plurality of stock frames disposed in a periphery of the rotary member, the stock frames each supporting the jig so as to be movable back and forth, wherein, by the rotation of the rotary member, an arbitrary one of the stock frames is selected to be in an exchanging position which longitudinally aligns with the supporting frame, wherein the jig is replaceable in the inward-looking posture between the supporting frame and the stock frame selected in the replacing position. According to this arrangement, when the jig is exchanged or replaced, the empty stock frame is selected in the exchanging position by rotating the rotary member. The used jig is transferred from the supporting frame provided on the supporting base into this stock frame. Thereafter, the stock frame supporting the jig for the next kind of the vehicle is selected into the exchanging position. From this stock frame the jig for the next kind of the vehicle is transferred into the supporting frame. Since the jig can be transferred in the inward-looking posture between the supporting frame and the stock frame in the exchanging position, the supporting base need not be arranged to be rotatable only for the purpose of exchanging the jig, thereby preventing the equipment cost from increasing.

In addition, if the apparatus further comprises: a no pair of longitudinally elongated upper and lower guide rails fixed to a backside of the jig, the guide rails lying vertically opposite to each other when the jig is in the inward-looking posture; and upper and lower guide members provided on each of the supporting frames and the stock frames such that the upper and lower guide rails of the jig are engaged in a manner movable back and forth, the jig can be stably moved back and forth while the jig is in the inward-looking posture. Further, even if the posture of the rotary member is changed by the rotation of the rotary member, the jig can be prevented from dropping out of the stock frame. In this case, if the apparatus further comprises a releasing mechanism provided on each of the stock frames for releasing each of the guide members off from each of the guide rails by narrowing a distance between the upper and lower guide members, the engagement between the guide rails and the guide member can be released and another jig can be placed, instead, on each of the stock frames. It is thus possible to exchange many kinds of jigs without limit to the number of stock frames.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

An explanation will now be made about an embodiment to which the present invention is applied. The embodiment shows an apparatus for assembling a vehicle body W by combining, by means of welding, a floor panel W1, a roof panel W2, a dashboard upper panel W3, and a rear tray W4 to left and right side panels W5, W5.

Figure 1:
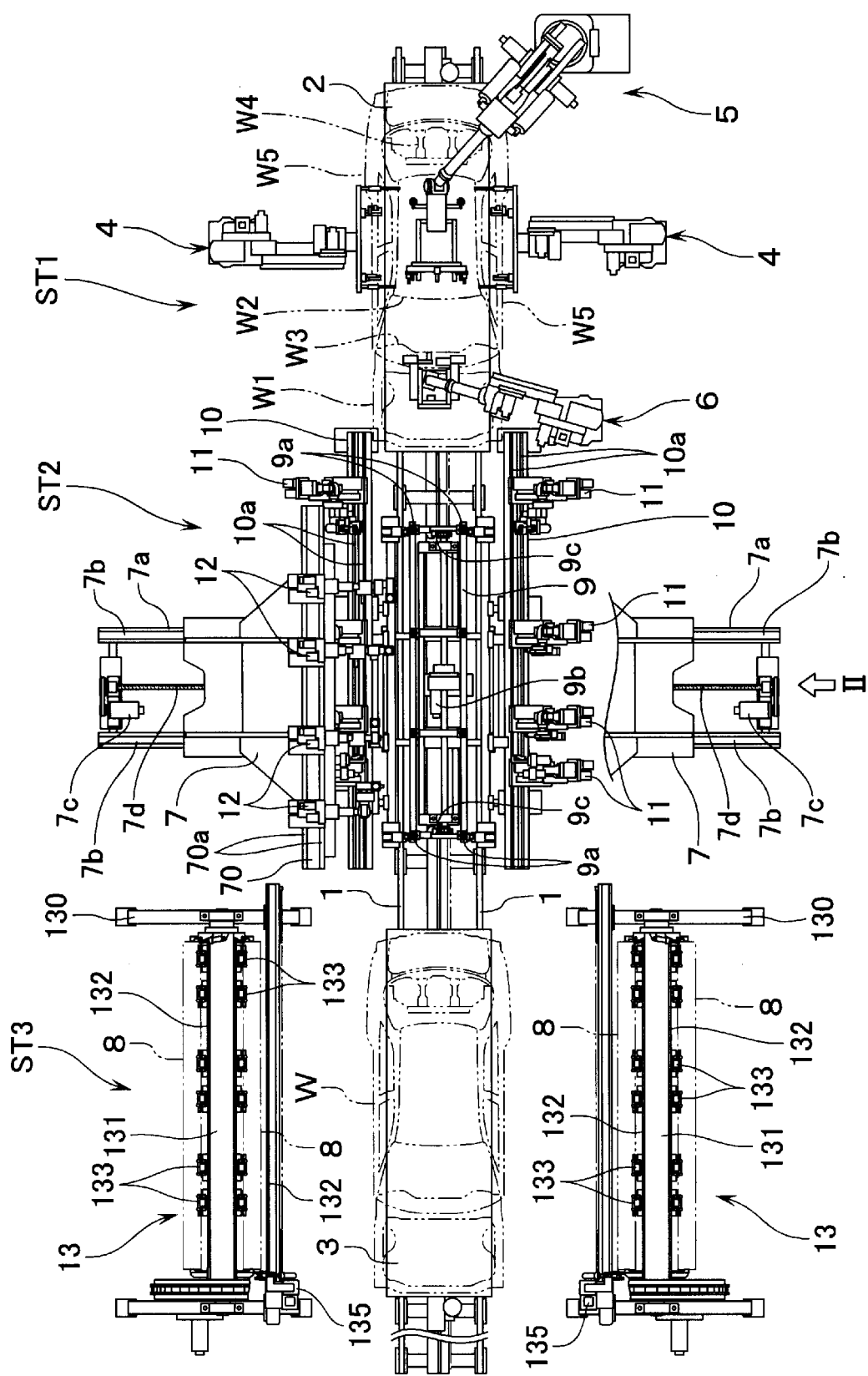
FIG. 1 is a plan view of one example of that apparatus for assembling a vehicle body to which the present invention is applied.
Figure 2:
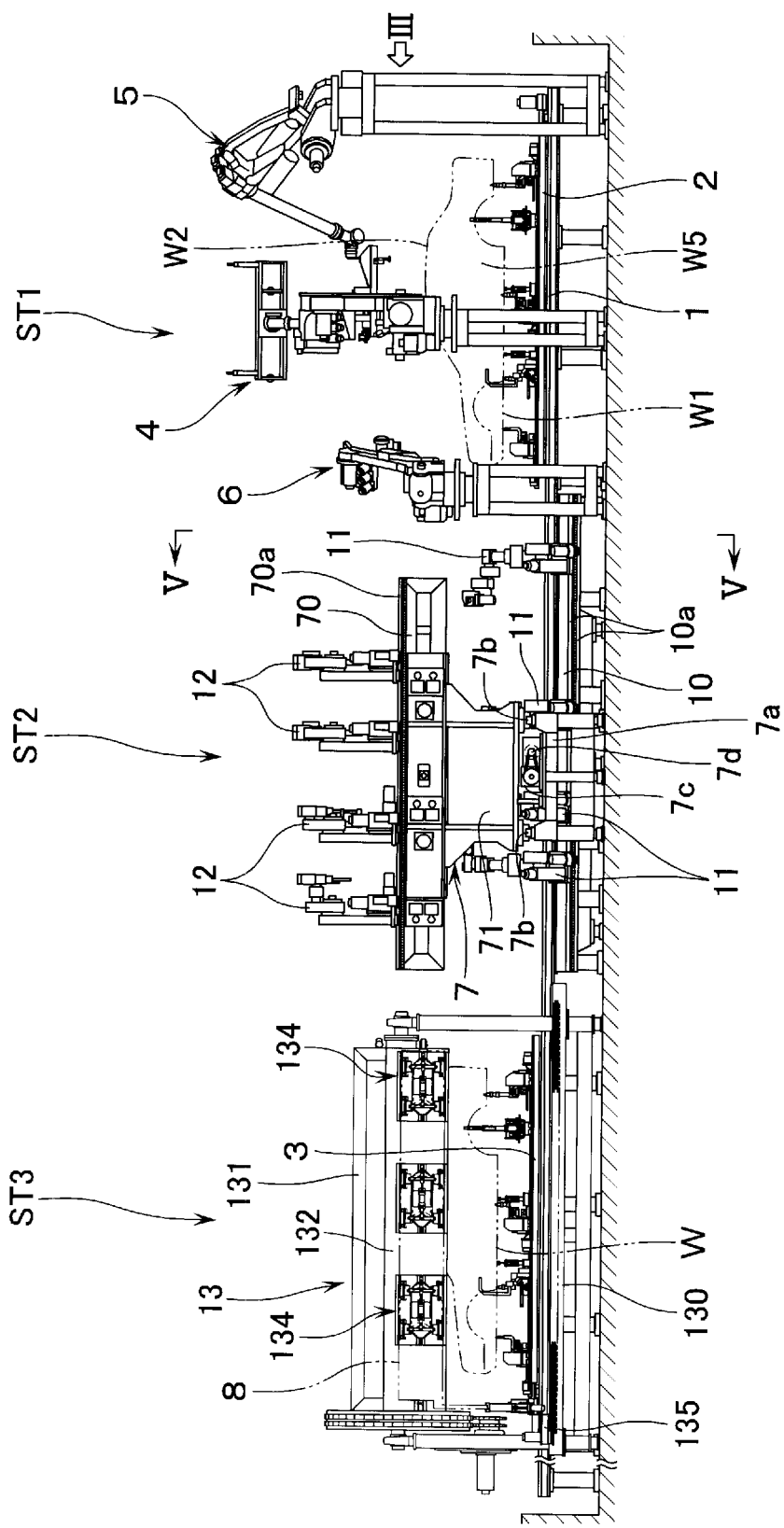
FIG. 2 is a side view of the apparatus for assembling the vehicle body as seen in the direction of an arrow II in FIG. 1.

The apparatus for assembling a vehicle body is made up, as shown in FIGS. 1 and 2, of a straight line which is elongated in a back and forth (i.e., longitudinal) direction and in which are disposed a setting station ST1, a vehicle body assembly station ST2, and a discharge station ST3, the stations being disposed from an upstream side (i.e., the right side in the figures) downwards in the order mentioned. On the line, there are disposed a pair of left and right guide rails 1, 1 so as to extend over the entire length of the line. On the guide rails 1, 1, there are placed: a setting cart 2 which moves back and forth (i.e., longitudinally) between the setting station ST1 and the vehicle body assembly station ST2; and a discharging boggy 3 which moves back and forth between the vehicle assembly station ST2 and the discharge station ST3. In the setting station ST1, the floor panel W1, the roof panel W2, the dashboard upper panel W3, the rear tray W4, and the left and right side panels W5 are set in position onto the setting cart 2 in a posture in which a front portion of the vehicle body looks forward of the line. Then, the setting cart 2 is moved forward to the vehicle body assembly station ST2. In the vehicle body assembly station ST2, the left and right side panels W5, W5 are combined by welding to the floor panel W1, the roof panel W2, the dashboard upper panel W3, and the rear tray W4. A vehicle body W thus assembled is transported by the discharge boggy 3 to the discharge station ST3. From this discharge station 3, the vehicle body W is discharged to a reinforcing welding line (not illustrated). In this specification, description is sometimes made about only one of a pair or more; it is however to be understood that the same or similar description applies to the other(s).

A pair of first setting robots 4, 4 for the side panels W5 are disposed on laterally (i.e., left and right) outside portions of the setting station ST1. A second setting robot 5 for the roof panel W2 and the rear tray W4 is disposed on one of the laterally outside portions on the rear side of the vehicle (i.e., rearward in the line) in the setting station ST1. A third setting robot 6 for the dashboard upper panel W3 is disposed at an end portion in the setting station ST1 on one of the laterally outside portions in front of the vehicle (i.e., forward in the line). When the setting cart 2 is returned to the setting station ST1, the floor panel W1 is set in position onto the setting cart 2 from the rear side of the line by means of a transfer apparatus (not illustrated). Also, the side panels W5, the rear tray W4, the roof panel W5, and the dashboard upper panel W3 are set in position onto the setting cart 2 by means of the first through third setting robots 4, 5, 6.

Figure 3:
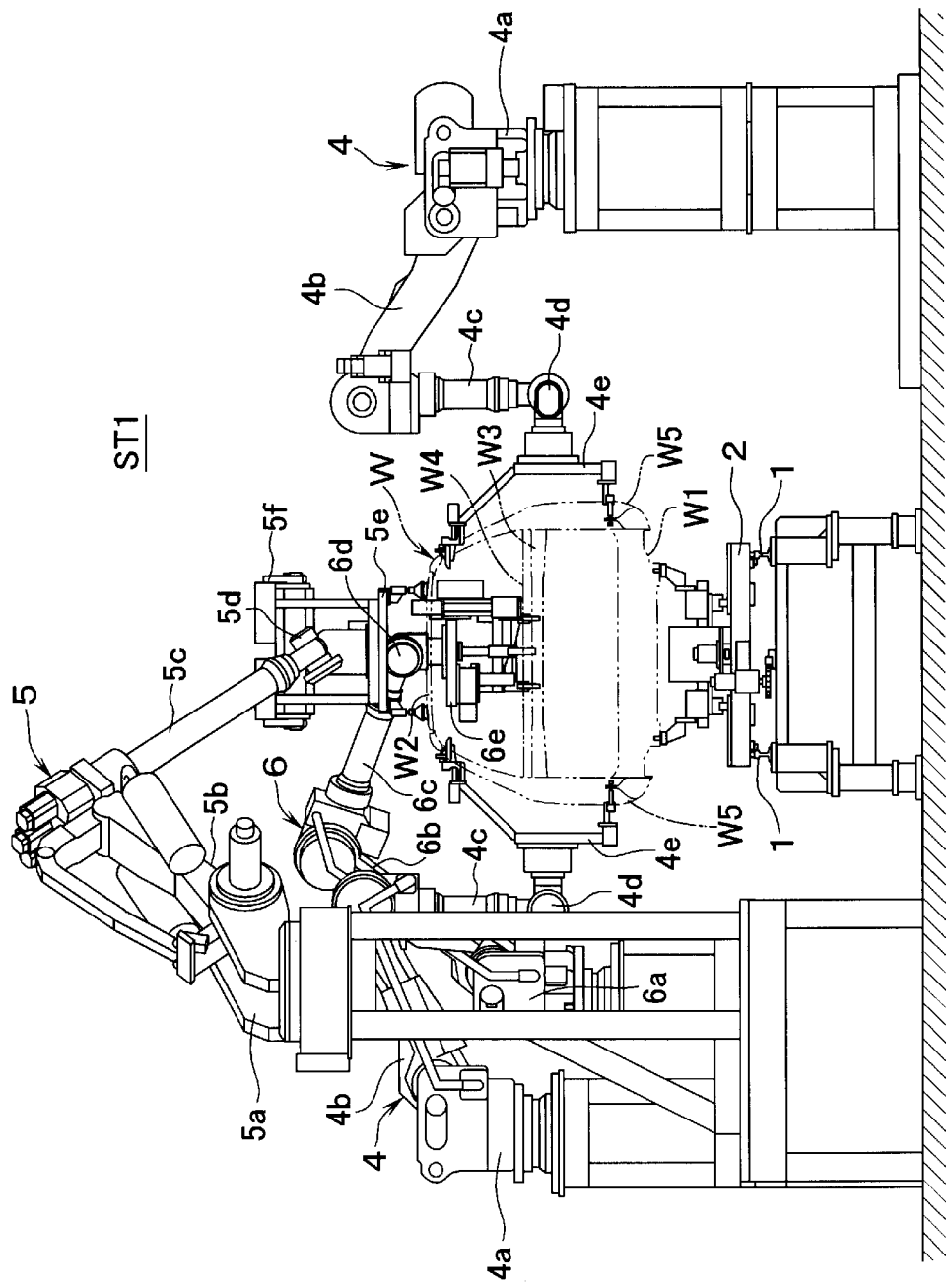
FIG. 3 is a front view of a setting station as seen from an arrow III in FIG. 2.

Each of the setting robots 4, 5, 6 is constituted, as shown in FIG. 3, by an articulated type of 6-axis robot having: a rotary base 4a, 5a, 6a which is rotatable about a vertical axial line; a first robot arm 4b, 5b, 6b which is swingably coupled to the rotary base 4a, 5a, 6a; a second robot arm 4c, 5c, 6c which is swingably coupled to a top end of the first robot arm 4b, 5b, 6b; and that wrist 4d, 5d, 6d of 3-axis construction which is coupled to a front end of the second robot arm 4c, 5c, 6c.

The wrist 4d which serves as a working end of the first setting robot 4 has attached thereto a side panel holding device 4e. The side panel W5, which is transported into an appropriate feeding position such as around a portion in which the first setting robot 4 is disposed or above the setting station ST2, is held by the side panel holding device 4e. The side panel W5 is thus set by the first setting robot 4 onto the setting cart 2.

The wrist 6d which serves as a working end of the third setting robot 6 has attached thereto a dashboard upper panel holding device 6e. The dashboard upper panel W3 which is transported into an appropriate feeding position around a portion in which the third setting robot 6 is disposed is held by the dashboard upper panel holding device 6e. The dashboard upper panel W3 is thus set by the third setting robot 6 in a predetermined setting position between the left and right side panels W5, W5 which are set in position onto the setting cart 2 by the pair of left and right first setting robots 4, 4.

Figure 4A:
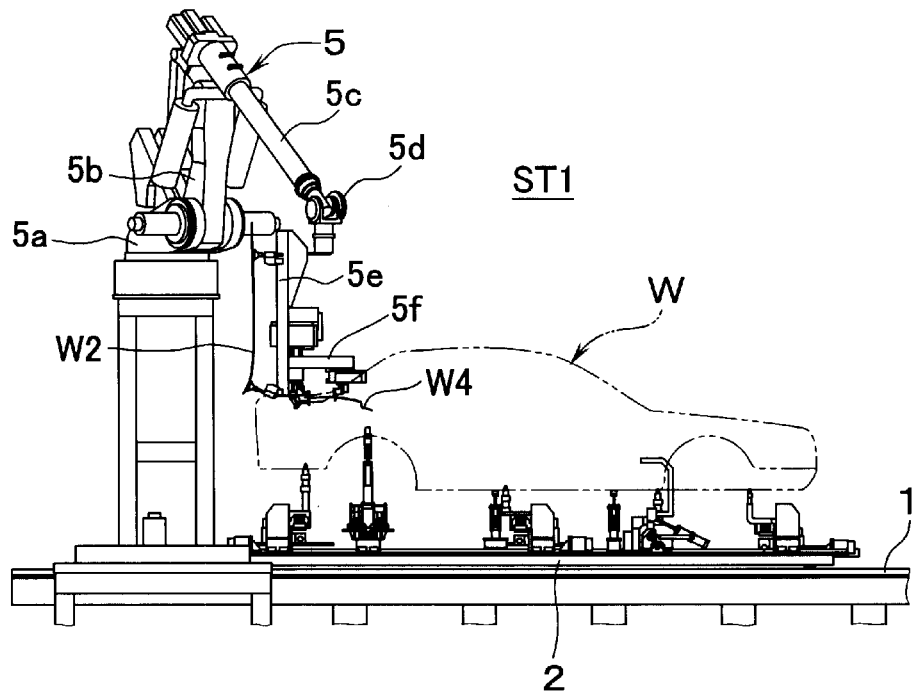
FIG. 4A is a side view showing a state of work of setting a rear tray by a second setting robot.
Figure 4B:
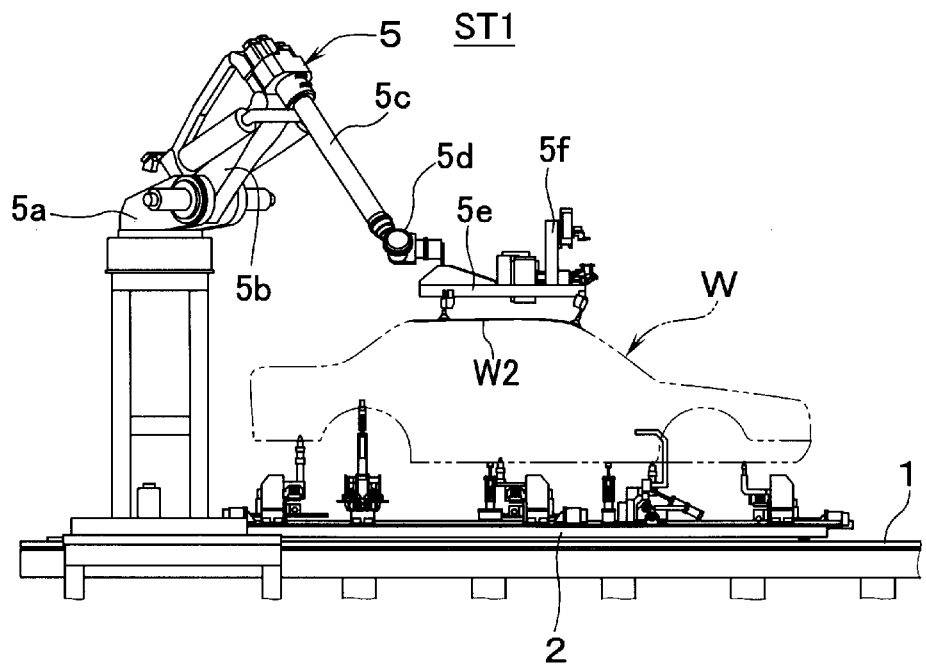
FIG. 4B is a side view showing a state of work of setting a roof panel by the second setting robot.

The wrist 5d which serves as a working end of the second setting robot 5 has attached thereto a roof panel holding device 5e for holding the roof panel W2. On that end portion of the roof panel holding device 5e which lies on the front end side of the roof panel W2, there is mounted, on a backside of the roof panel holding device 5e, a rear tray holding device 5f which holds the rear tray 4 such that the lower surface of the rear tray W4 looks forward of the roof panel W2. The roof panel W2 and the rear tray W4 which are transported into an appropriate feeding position around the portion in which the second setting robot 5 is disposed are held by the roof panel holding device 5e and the rear tray holding device 5f, respectively. Then, as shown in FIG. 4A, the roof panel holding device 5e is first set into an erected posture in which the rear tray holding device 5f looks downward. In this state, the rear tray W4 is set into a predetermined setting position between rear upper edges of the left and right side panels W5, W5 which are set in position on the setting cart 2. At this time, the roof panel W2 is in an erected posture in a position offset backward of the vehicle body (in the rear of the line) relative to the rear tray W4. Therefore, the rear tray W4 can be set in position without giving rise to an interference of the roof panel W2 with the side panels W5, W5. Thereafter, the roof panel holding device 5e is changed to a horizontal posture as shown in FIG. 4B. The roof panel W2 is thus set in position between the upper edges of the left and right side panels W5, W5. In this manner, by performing the work of setting the rear tray W4 and the roof panel W2 by means of the second setting robot 5, the number of robots to be used can be reduced, resulting in a reduction in the equipment cost.

Figure 5:
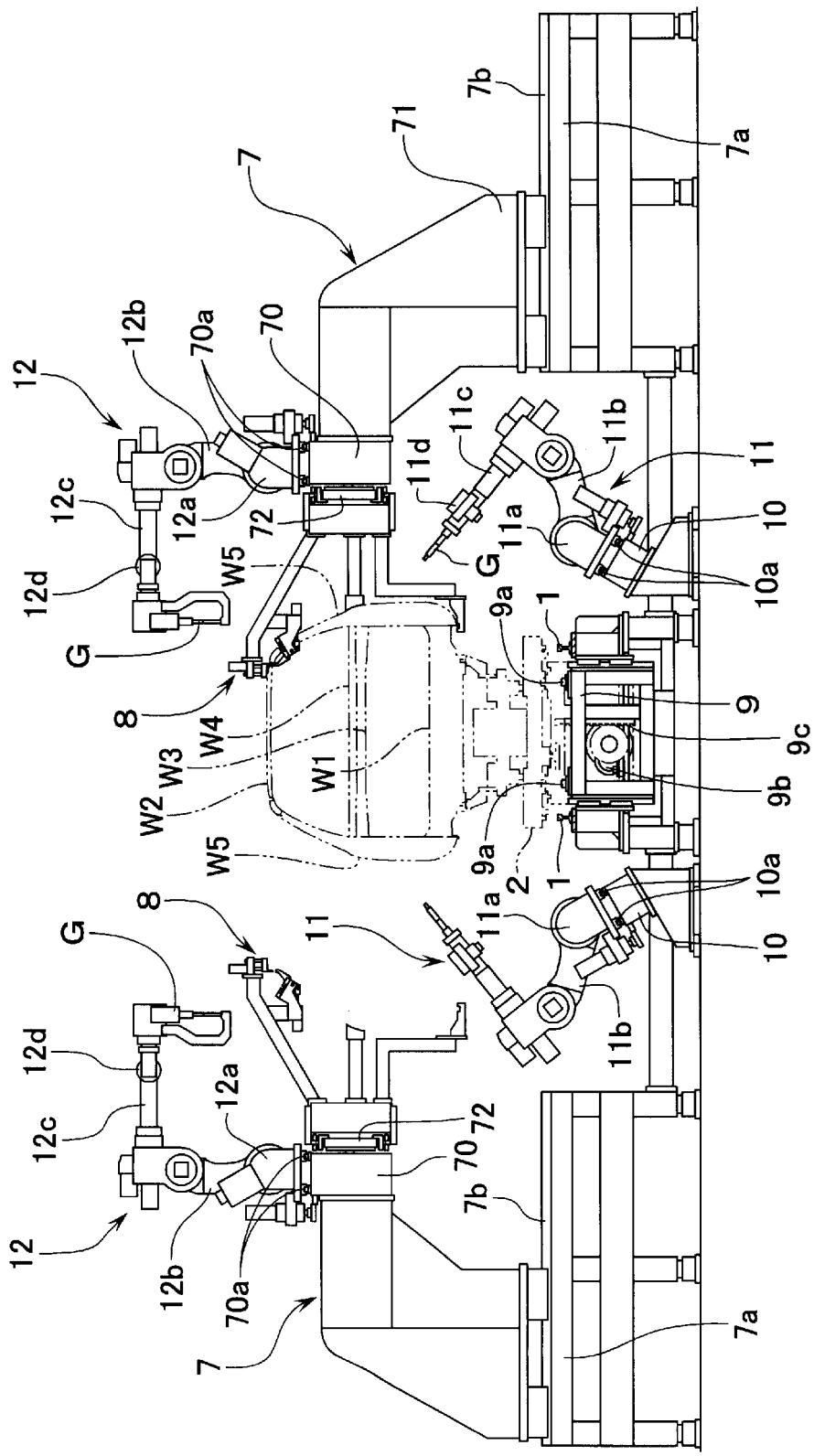
FIG. 5 is a front view of a vehicle body assembly station taken along the line V—V in FIG. 2.

On each of laterally outside portions of the vehicle body assembly station ST2, there is disposed, as shown in FIGS. 1, 2 and 5, a supporting base 7. The supporting base 7 is laterally movable by an electric motor 7c through a feeding screw 7d along guide rails 7b on a stationary base 7a between a laterally inward working position (right half position in FIG. 5) and a laterally outward shunted (waiting) position (left half position in FIG. 5). On an upper frame 70 which is fixed to the upper portion of the supporting base 7 and which is elongated in the longitudinal direction, there is mounted in a laterally inward-looking posture a jig 8 which positions and holds the side panel W5. In addition, in the vehicle body assembly station ST2, there is provided a lifting base 9 which is vertically movable by an electric motor 9b through a rack and pinion mechanism 9c. The lifting base 9 is provided with a plurality of positioning pins 9a which are fitted into a plurality of holes which are formed in a lower surface of the setting cart 2. Then, after moving forward the setting cart 2 to the vehicle body assembly station ST2, the setting cart 2 is positioned and lifted off from the guide rails 1 by the upward movement of the lifting base 9. In this state, the supporting base 7 is moved to the working position. Each of the side panels W5, W5 on the setting jig 2 is received by the jig 8 in a state in which the side panels W5, W5 are combined with the floor panel W1, the roof panel W2, the dashboard upper piece W3, and the rear tray W4.

Further, on each of the lateral sides of the vehicle body assembly station ST2, there is disposed a longitudinally elongated stationary frame 10 at a level below the jig 8. Four welding robots 11, 12 are mounted on the stationary frame 10 and on the upper frame 70 of the supporting base 7, respectively. The side panel W5 which is supported by the jig 8 is welded for combination with the floor panel W1 by the welding robots 11 mounted on the stationary frame 10. Further, the side panel W5 is welded for combination with the roof panel W2, the dashboard upper panel W3, and the rear tray W4 by the welding robots 12 mounted on the upper frame 70.

Each of the welding robots 11, 12 is constituted by a 6-axis robot having: a robot main body 11a, 12a which is longitudinally movable along guide rails 10a, 70a which are fixed to the stationary frame 10 and the upper frame 70, respectively; a first robot arm 11b, 12b which is swingably coupled to the robot main body 11a, 12a; a second robot arm 11c, 12c which is swingably coupled to a top end of the first robot arm 11b, 12b; and that wrist 11d, 12d of 3-axis construction which is coupled to a front end of the second robot arm 11c, 12c. A welding gun G which is mounted on each of the wrists 11d, 12d is moved to, and perform spot welding at, predetermined spot welding points at which the side panel W5 is combined with the other vehicle body constituting members such as the floor panel W1 or the like.

The supporting base 7 is formed into a "T" configuration in which a longitudinal length (i.e., a length in the longitudinal direction) of a lower portion 71 thereof is made smaller than the longitudinal length of the upper frame 70. An open space which extends to the stationary frame 10 is thus secured in the front and rear of the lower portion 71 of the supporting base 7. In this arrangement, by gathering the welding robots 11 on the stationary frame 10 in those front and rear portions of the stationary frame 10 which face this open space, maintenance work such as electrode tip dressing of the welding guns G can be performed at a good workability on all of the welding robots 11 on the stationary frame 10.

Figure 6:
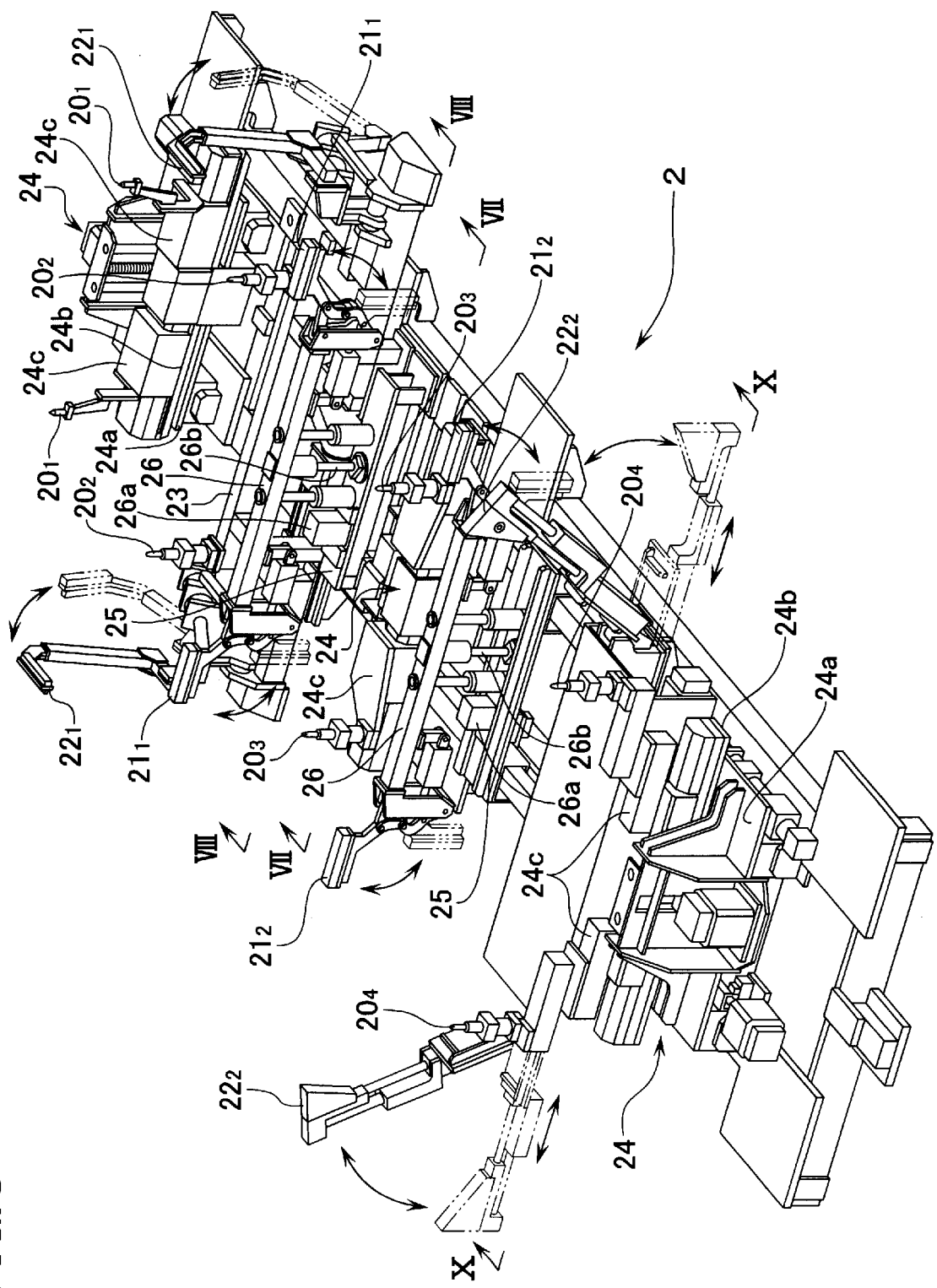
FIG. 6 is a perspective view of a setting cart.

The setting cart 2 is provided, as shown in FIG. 6, with: floor panel supporting members $20_1$, $20_2$, $20_3$, $20_4$ which position and support the floor panel W1 at four longitudinal points and which are disposed in a lateral (i.e., left and right) pair in a total of four longitudinal sets (i.e., four sets arranged in the longitudinal direction); side sill receiving members $21_1$, $21_2$ which receive side sill portions and which are disposed in a lateral pair in a total of two longitudinal sets, the side sill portions being defined as the combined portions between the floor panel W1 and each of the side panels W5, W5; and side panel forcing members $22_1$, $22_2$ which force the left and right side panels W5, W5 from a lateral outside at front-pillar portions and rear wheel-house portions, and which are disposed in a lateral pair in a total of two longitudinal sets. In this arrangement, the left and right side panels W5, W5 are forced or urged against the floor panel W1 by the side panel forcing members $22_1$, $22_2$. The roof panel W2, the dashboard upper panel W3, and the rear tray W4 are held in a pinched (or sandwiched) manner between both the side panels W5, W5.

The floor panel supporting members $20_1$–$20_4$ are constituted by pin-shaped members for fitting into holes which are formed in the floor panel W1. Here, the floor panel supporting member $20_2$ for supporting the floor panel W1 at a front end of a vehicle compartment portion is vertically provided on a stationary frame 23 on the setting cart 2 and is, therefore, immovable relative to the setting cart 2. On the other hand, the remaining floor panel supporting members $20_1$, $20_3$, $20_4$ are adjustable in position in the longitudinal, lateral, and vertical directions by means of cross table units 24 of 3-axis construction. They are thus arranged to be able to cope with the change in the kind of the vehicle. Each of the cross table units 24 has the following construction. Namely, a vertically movable second table 24b is mounted on a longitudinally movable first table 24a. A lateral pair of third tables 24c, 24c which are laterally movable toward, and away from, each other are mounted on the second table 24b. Each of the floor panel supporting members $20_1$, $20_3$, $20_4$ is vertically disposed on the third tables 24c.

Figure 7:
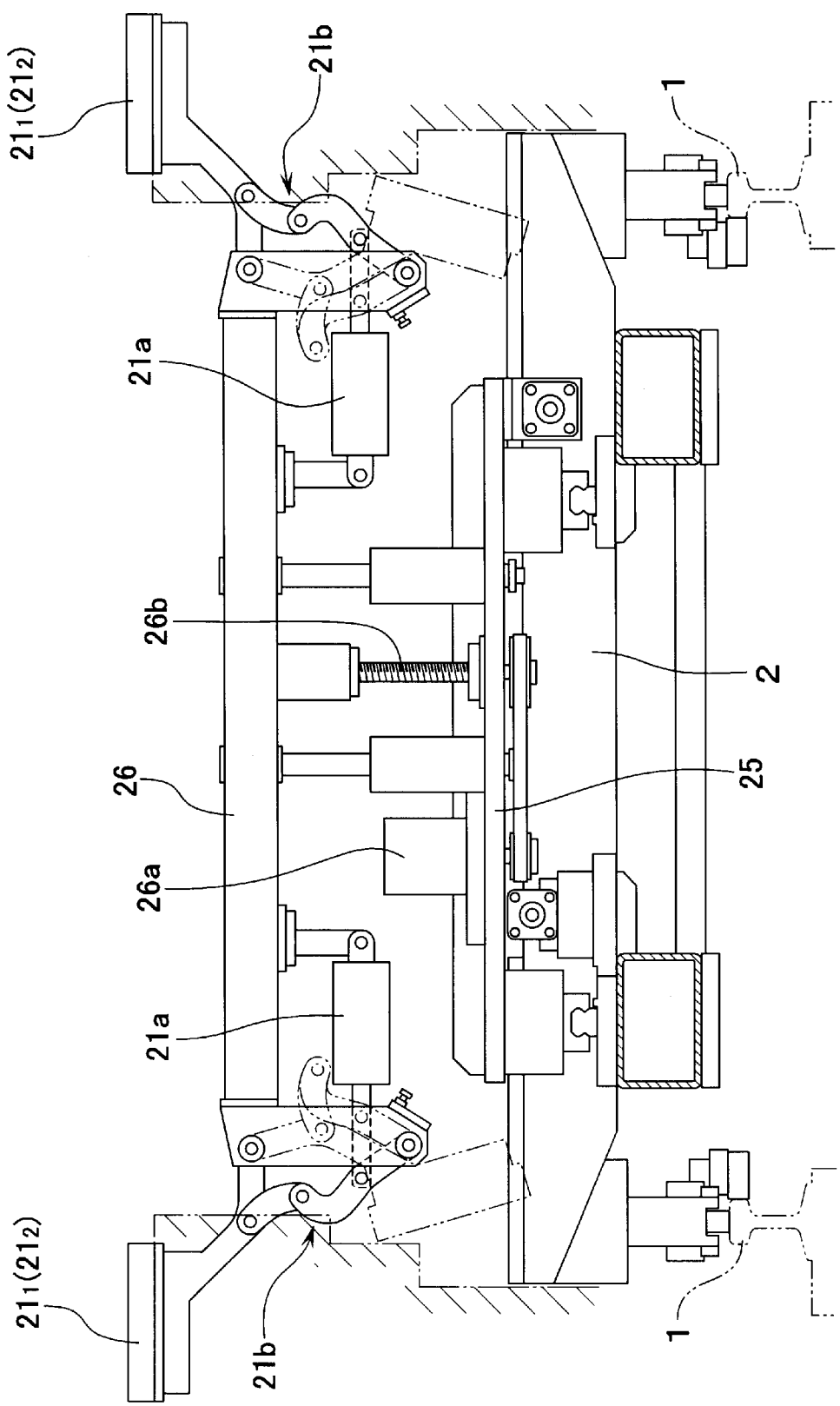
FIG. 7 is a front view of a side sill receiving member taken along the line VII—VII in FIG. 6.

Each of the side sill receiving members $21_1$, $21_2$ is also arranged to be adjustable in position in the longitudinal and vertical directions so as to cope with the change in the kind of the vehicle. In other words, a lifting frame 26 which is vertically movable by an electric motor 26a through a feeding screw mechanism 26b is provided on a longitudinally movable frame 25. Each of the side sill receiving members $21_1$, $21_2$ is mounted on the lifting frame 26. Further, each of the side sill receiving members $21_1$, $21_2$ is mounted, as shown in FIG. 7, on this lifting frame 26 so as to be vertically swingable by a cylinder 21a through a toggle link mechanism 21b. Hatched areas in FIG. 7 denote areas of interference with the welding robots 11 on the stationary frames 10 while the welding robots 11 are in welding operation. By swinging downward each of the side sill receiving members $21_1$, $21_2$, each of the side sill receiving members $21_1$, $21_2$ is retracted or withdrawn into that shunted position as shown by imaginary lines in FIG. 7 in which no interference occurs with the welding robots 11 in the welding operation.

Figure 8:
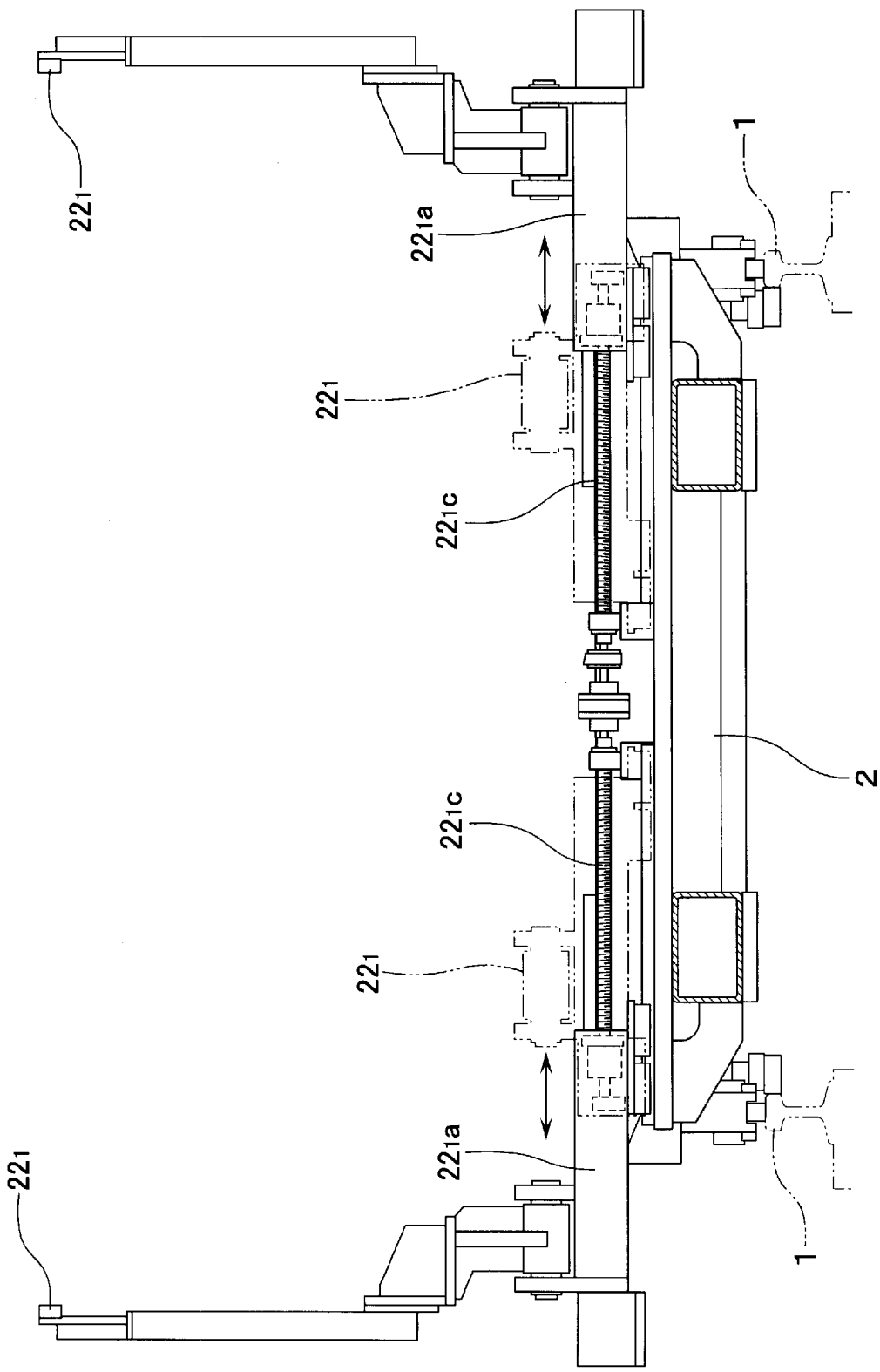
FIG. 8 is a front view of a first side panel forcing member taken along the line VIII—VIII in FIG. 6.
Figure 9:
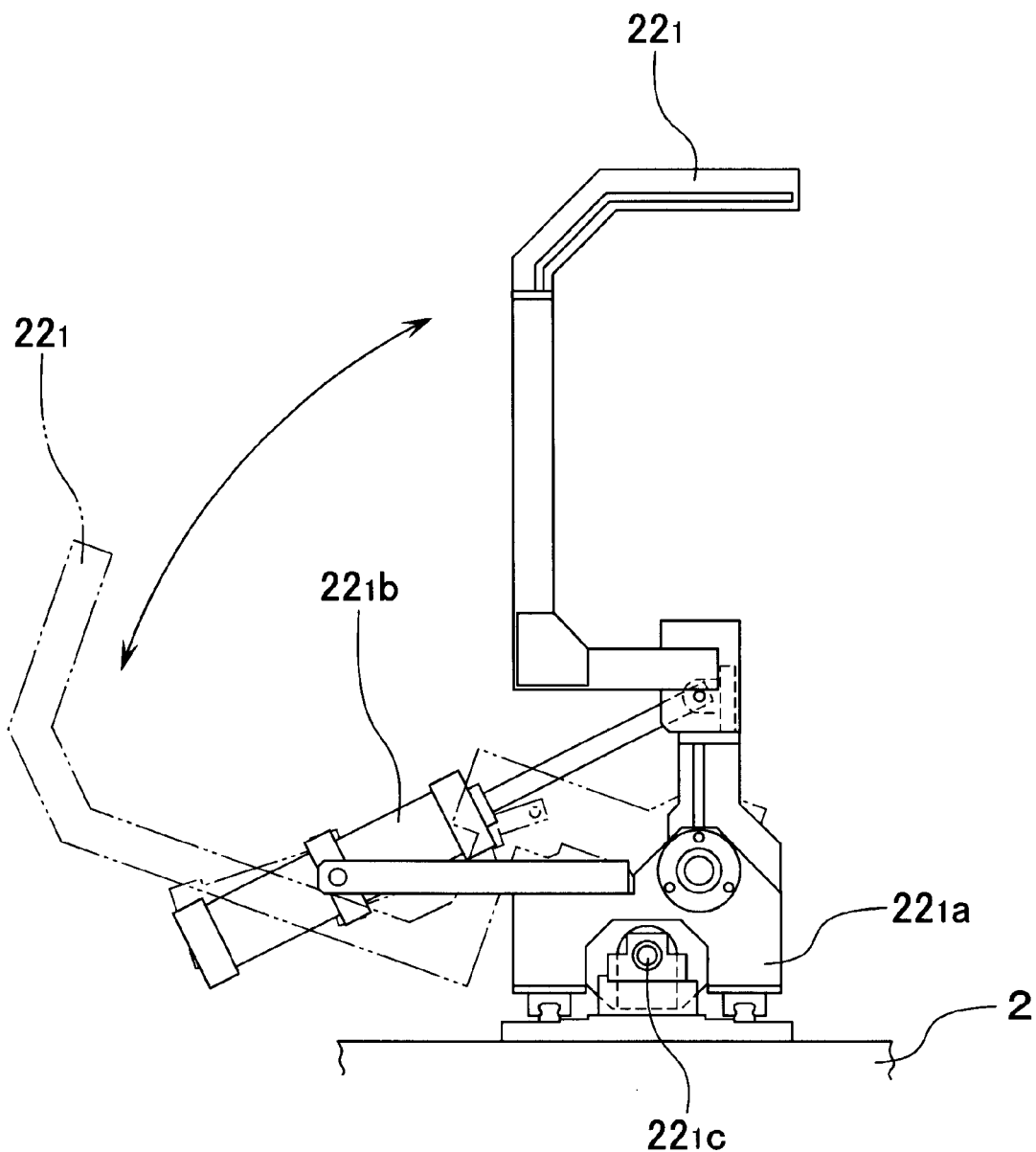
FIG. 9 is a left side view of FIG. 8.

The lateral pair of first side panel forcing members $22_1$, $22_1$ which force the front-pillar portions of the side panels W5, W5 are mounted, as shown in FIGS. 8 and 9, on a pair of laterally movable left and right slide frames $22_1a$, $22_1a$ in a manner capable of being longitudinally erected and laid down by cylinders $22_1b$, $22_1b$. Both the slide frames $22_1a$, $22_1a$ are synchronously moved laterally inward and outward by means of a lateral pair of feeding screws $22_1c$, $22_1c$ which are synchronously driven by an electric motor through a belt (both not illustrated). In this manner, by moving both the slide frames $22_1a$, $22_1a$ laterally inward in a state in which both the first side panel forcing members $22_1$, $22_1$ are erected, the left and right side panels W5, W5 can be forced inward from a lateral outside. Further, by moving the slide frames $22_1a$, $22_1a$ to laterally inner end positions as shown by imaginary lines in FIG. 8 in a state in which the first side panel forcing members $22_1$, $22_1$ are laid down toward the front of the vehicle body (i.e., the front of the line), the first side panel forcing members $22_1$, $22_1$ can be retracted into shunted positions which are free from interference with the welding robots 11 in welding operation.

Figure 10:
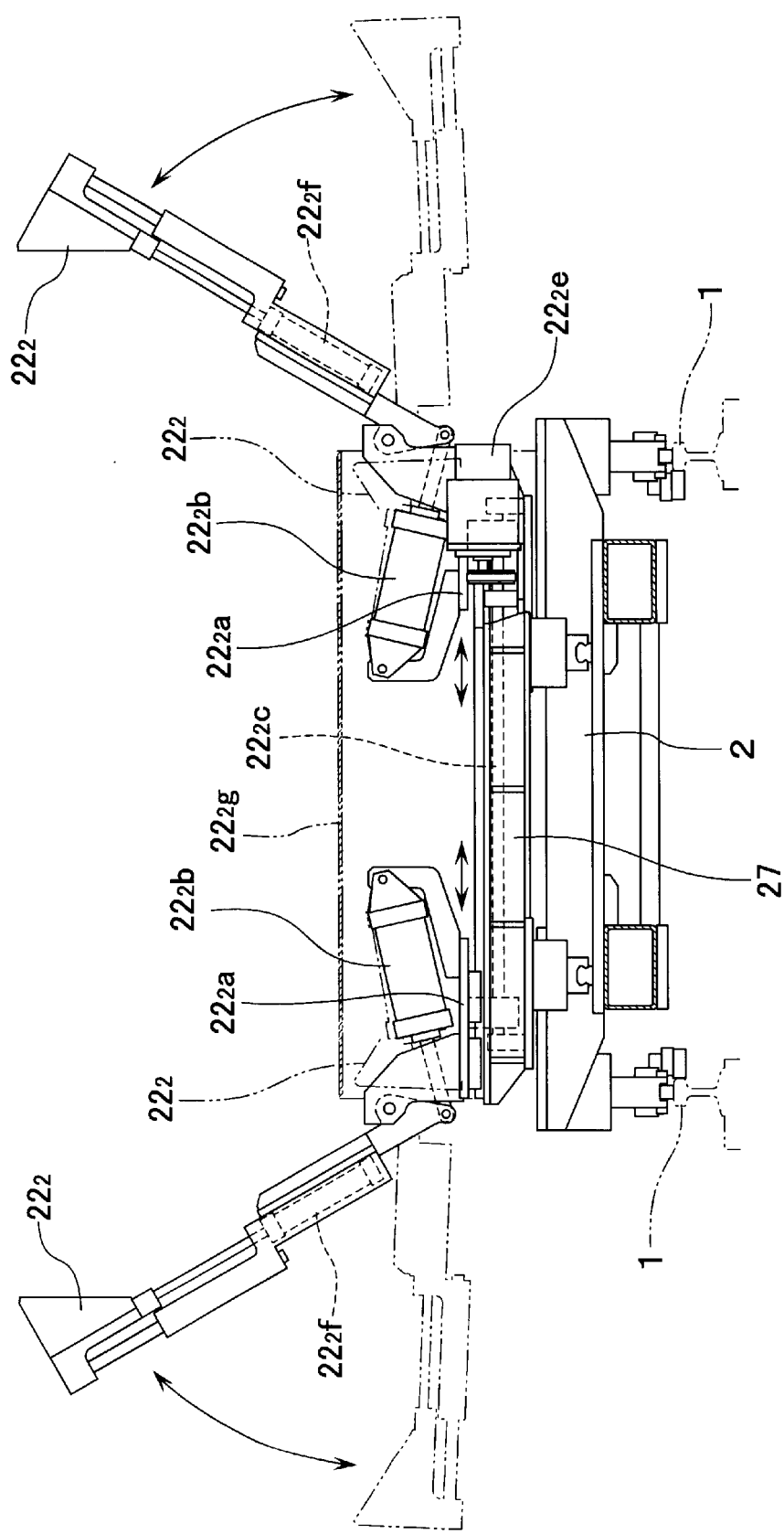
FIG. 10 is a front view of a second side panel forcing member taken along the line X—X in FIG. 6.
Figure 11:
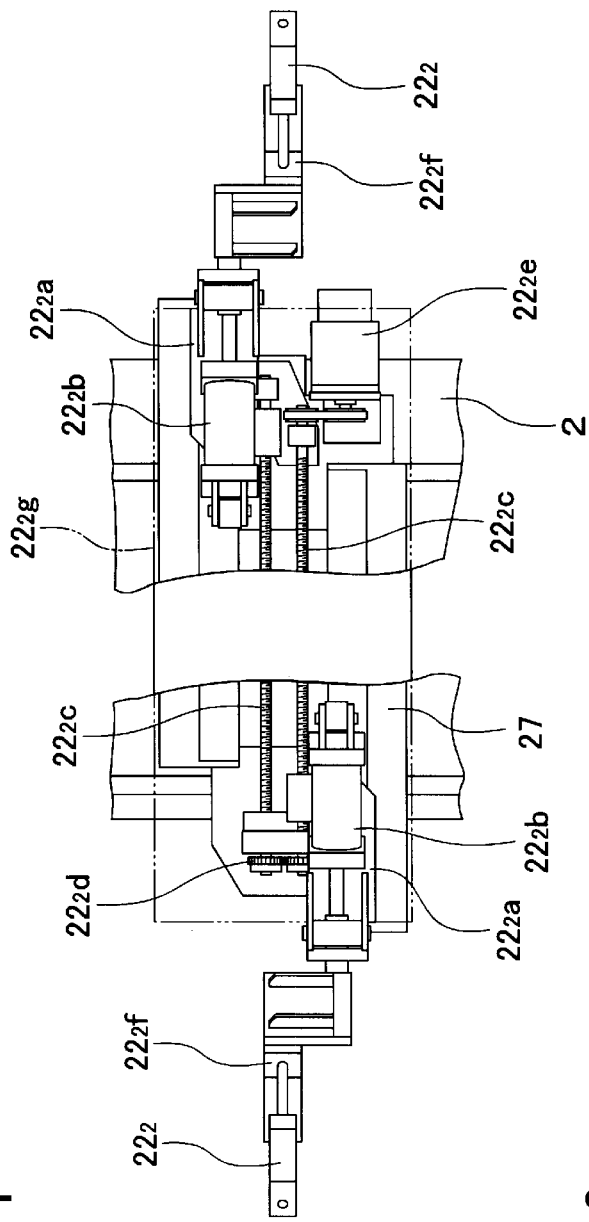
FIG. 11 is a plan view of the second side panel forcing member.

The lateral pair of second side panel forcing members $22_2$, $22_2$ which push the rear wheel-house portions of the side panels W5, W5 are mounted, as shown in FIGS. 10 and 11, on a longitudinally movable frame 27 so as to cope with the change in the kind of the vehicle by adjusting the position in the longitudinal direction. On the longitudinally movable frame 27, there are provided, in a longitudinally offset manner, a lateral pair of slide frames $22_2a$, $22_2a$ which are laterally movable. Each of the second side panel forcing members $22_2$ is mounted on each of the slide frames $22_2a$ so as to be laterally erected or laid down by a cylinder $22_2b$. A pair of front and rear feeding screws $22_2c$, $22_2c$, which are respectively coupled to both the slide frames $22_2a$, $22_2a$, are rotatably supported on the movable frame 27. The feeding screws $22_2c$, $22_2c$ are coupled to each other at one end thereof through gears $22_2d$. By driving one $22_2c$ of the feeding screws by an electric motor $22_2e$ which is mounted on the movable frame 27, both the slide frames $22_2a$, $22_2a$ are synchronously moved laterally inward and outward. In this manner, by moving both the slide frames $22_2a$, $22_2a$ laterally inward in a state in which both the second side panel forcing members $22_2$, $22_2$ are erected, the left and right side panels W5, W5 can be forced from a lateral outside. In addition, each of the second side panel forcing members $22_2$, $22_2$ is constituted so as to be extended and contracted by a cylinder $22_2f$. If the slide frames $22_2a$, $22_2$ are moved laterally inward in a state in which the second side panel forcing members $22_2$, $22_2$ are laid down laterally outward, and if the second side panel forcing member $22_2$, $22_2$ are contracted, the second side panel forcing members $22_2$ can be retracted or withdrawn into those shunted positions as shown by imaginary lines in FIG. 10 which are free from interference with the welding robots 11. In the figure, reference numeral $22_2g$ denotes a cover.

According to the above-described arrangement, even if the welding work by the welding robots 11 is started in the vehicle body assembly station ST2 immediately after the side panels W5, W5 on the setting cart are received by the jig 8 together with other vehicle body constituting members such as the floor panel W1 or the like, the setting jig 2 can be returned to the setting station ST1 without interference with the welding robots 11 by pulling the side sill receiving members $21_1$, $21_2$ and the side panel forcing members $22_1$, $22_2$ into the shunted positions as described above. Since the welding work in the vehicle body assembly station ST2 can thus be started without waiting for the returning of the setting cart 2 back to the setting station ST1, the cycle time can be shortened.

The jig 8 to be mounted on the supporting base 7 is specially arranged for each kind of the vehicle and, therefore, the jig 8 must be replaced whenever the vehicle is changed in kind. To meet this requirement, on each of the left and right side portions in the discharge station ST3, there is disposed a jig exchange (or replacement) device 13 in close proximity to the front side of the supporting base 7. The jig 8 is thus capable of being exchanged (or replaced) between the supporting base 7 and the jig exchange device 13.

Figure 12:
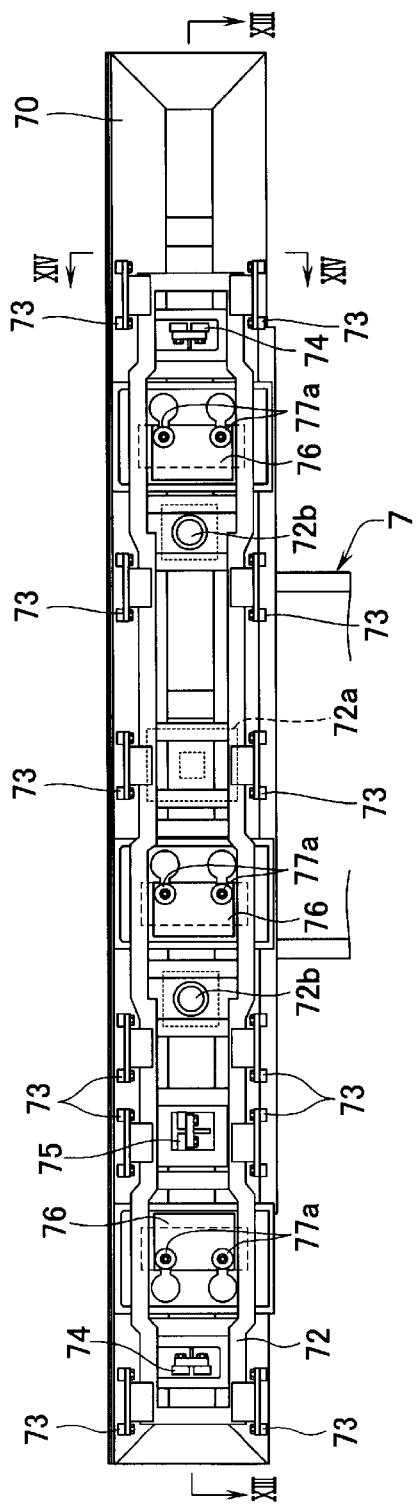
FIG. 12 is a side view of an upper portion of a supporting base as seen from a lateral inside.
Figure 13:
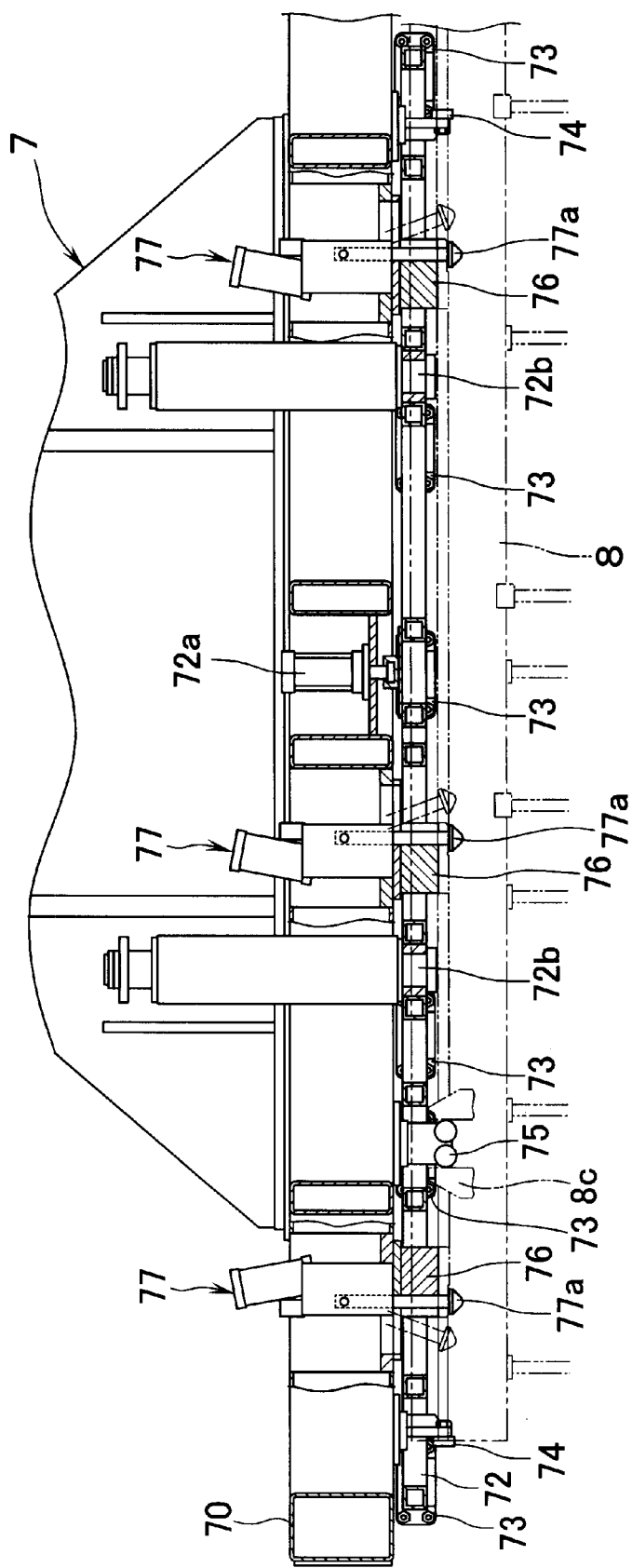
FIG. 13 is a plan view, partially shown in section, taken along the line XIII—XIII in FIG. 12.
Figure 14:
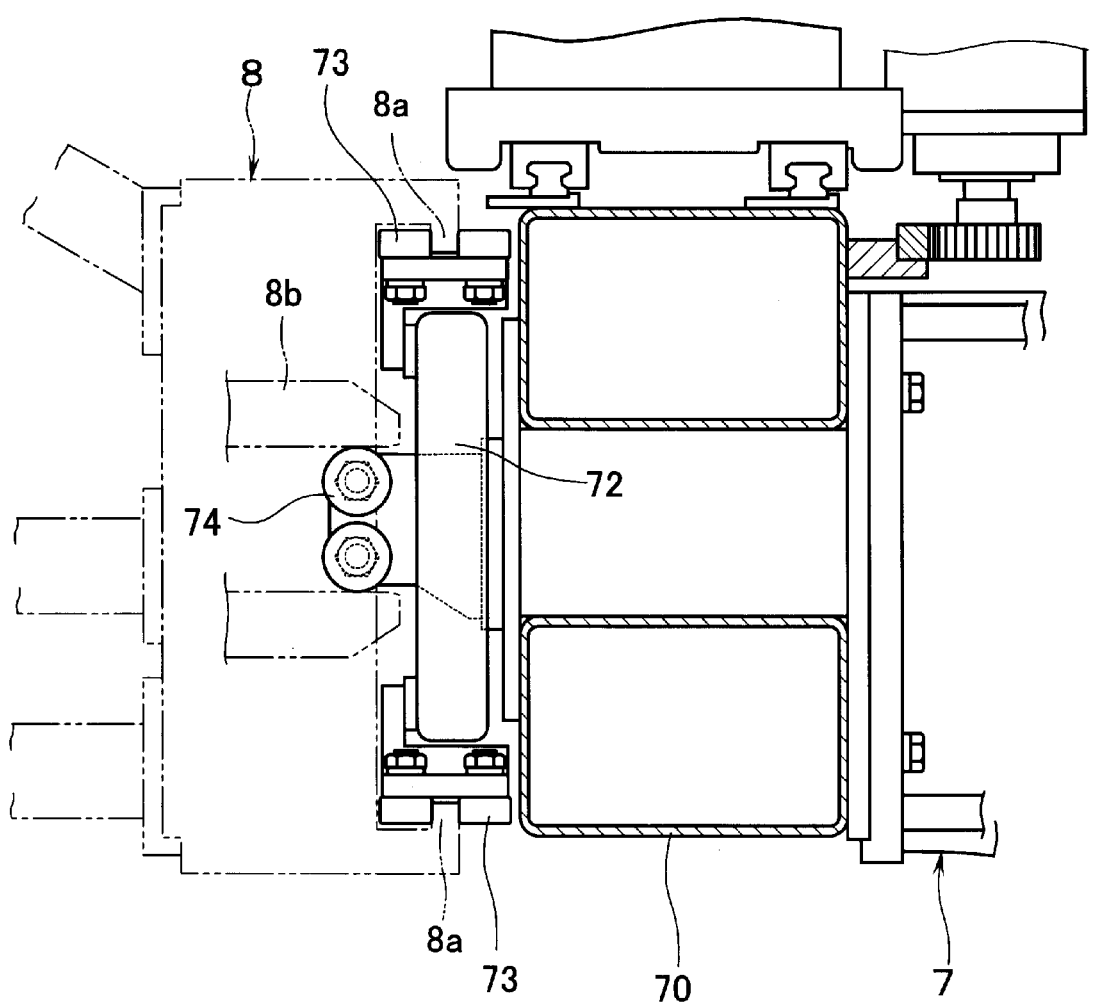
FIG. 14 is an enlarged sectional view taken along the line XIV—XIV in FIG. 12.

An upper frame 70 of the supporting base 7 is provided with a supporting frame 72 for supporting the jig 8. As shown in FIGS. 12 through 14, the supporting frame 72 has mounted thereon a plurality of roller units 73. These roller units 73 serve as upper and lower guide members which engage with a pair of upper and lower guide rails 8a, 8a which are disposed on a backside of the jig 8 in a manner to lie vertically opposite to each other. The jig 8 can thus be supported on the supporting frame 72 through the guide rails 8a, 8a and the roller units 73 so as to be longitudinally movable while the jig 8 is in an inward-looking posture.

The supporting frame 72 is supported on the upper frame 70 so as to be laterally movable toward, and away from, the upper frame 70 by means of a cylinder 72a through a pair of guide bars 72b, 72b which are disposed at a longitudinal distance from each other. The upper frame 70 is provided with positioning members 74 for positioning in the vertical direction and positioning members 75 for positioning in the longitudinal direction. When the supporting frame 72 is pulled toward the upper frame 70, a vertically positioning engaging member 8b and a longitudinally positioning engaging member 8c, which are disposed on the backside of the jig 8, are engaged with the respective corresponding positioning members 74, 75. The jig 8 is thus positioned in the vertical and longitudinal directions relative to the upper frame 70. The upper frame 70 is further provided with clamping members 77 having swing type of clamping rods 77a. The clamping rods 77a clamp the jig 8 so that the backside of the jig 8 comes into close contact with receiving seats 76 which are fixed to the upper frame 70 and which serve as a basis for the lateral positioning of the jig 8. In this manner, when the supporting frame 72 is pulled toward the upper frame 70 and the clamping members 77 are operated, the jig 8 is fixed to the upper frame 70 in a state in which the jig 8 is positioned in respect of three dimensions.

Figure 15:
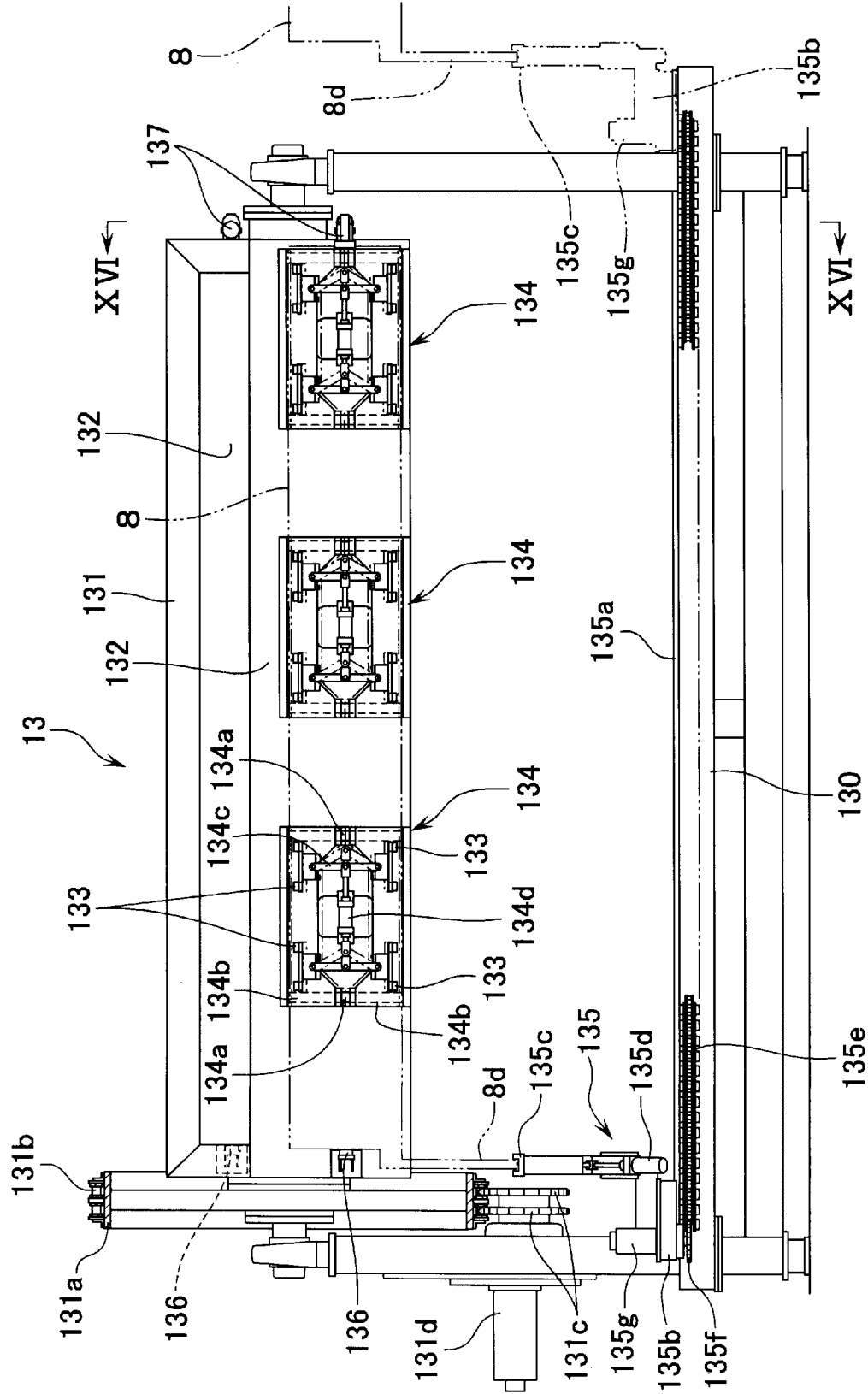
FIG. 15 is a side view taken from a lateral inward of the jig replacing device.
Figure 16:
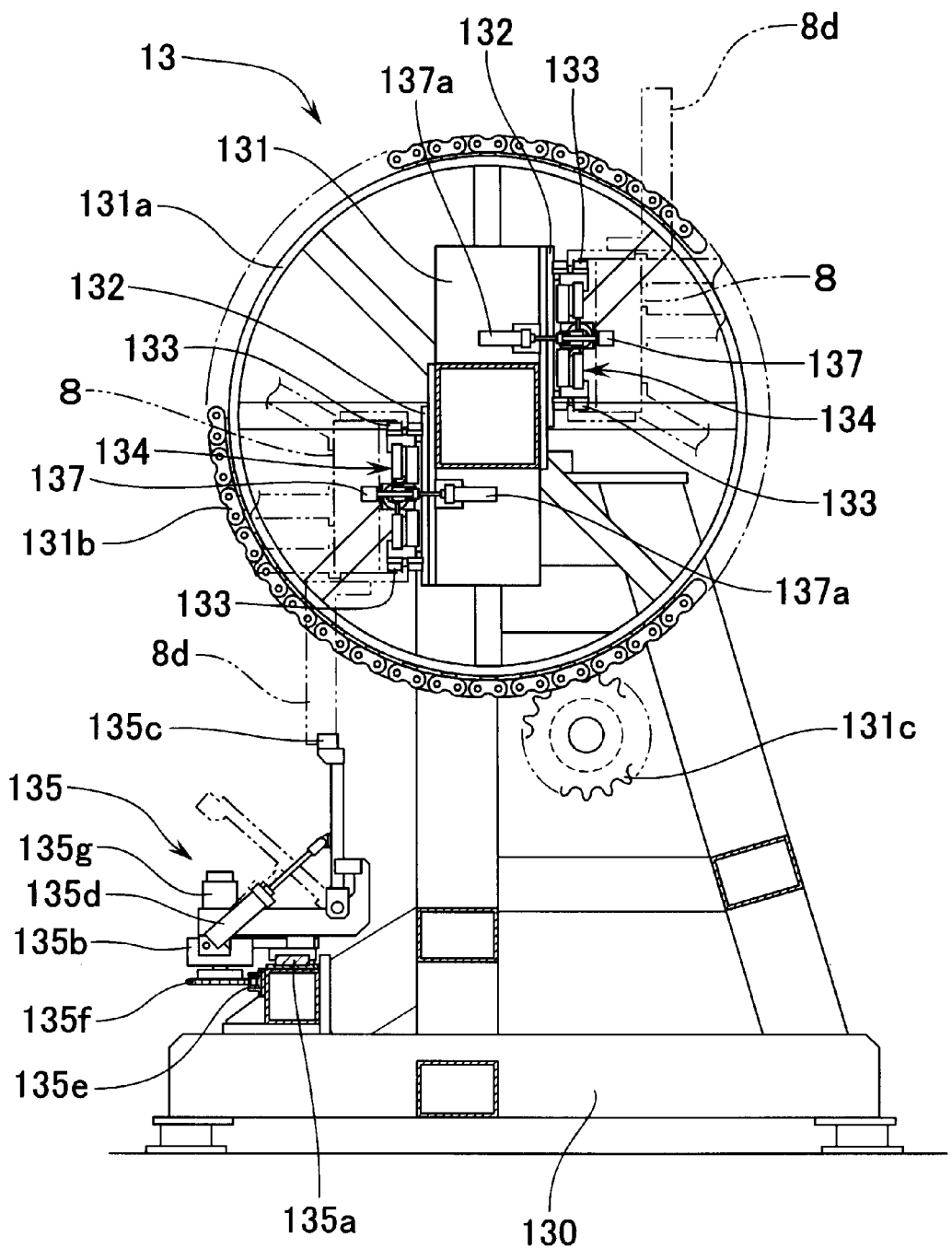
FIG. 16 is a sectional view taken along the line XVI—XVI in FIG. 15.
Figure 17:
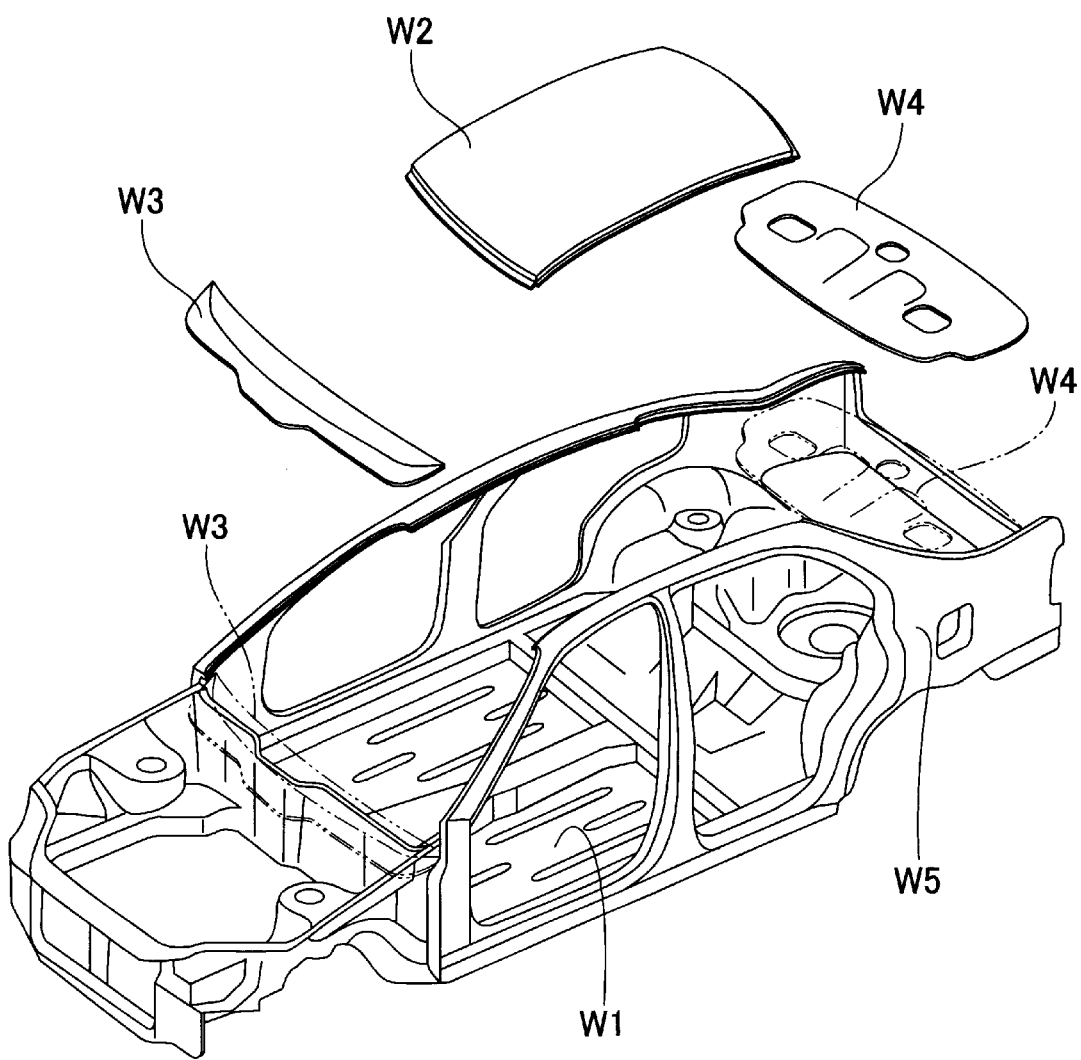
FIG. 17 is a perspective view showing vehicle body constituting members.

The jig exchange device 13 is provided, as shown in FIGS. 15 and 16, with a rotary member 131 which is supported on a base 130 so as to be rotatable about a longitudinal axis. A circular wheel 131a is fixed to a front end of the rotary member 131. On the base 130, there is mounted an electric motor 131d having that sprocket 131c on an output shaft thereof which is meshed with a chain 131b wound around the wheel 131a. The rotary member 131 is thus arranged to be rotatable by the electric motor 131d.

The rotary member 131 is constituted by a rectangular frame body which is elongated in the longitudinal direction. A stock frame 132 for the jig 8 is mounted on each side surface of the rotary member 131. By rotating the rotary member 131, an arbitrary one of the stock frames 132, 132 can be selected in a laterally inward jig exchanging (or replacing) position. Each of the stock frames 132, 132 is provided with a plurality of roller units 133 which serve as upper and lower guide members with which the pair of upper and lower guide rails 8a, 8a of the jig 8 are engaged. In this manner, the jig 8 is supported by the stock frame 132 through the guide rails 8a, 8a and the roller units 133 so as to be movable in the longitudinal direction.

The above-described jig exchange position is arranged as follows. Namely, when the supporting base 7 is moved to the shunted position and the supporting frame 72 is moved laterally inward away from the upper frame 70, the roller units 73 on the supporting frame 72 and the roller units 133 on the stock frame 132 in the exchange position are aligned with each other on a longitudinal straight line. In this manner, the jig 8 can be transferred in an inward-looking posture guided by the roller units 133, 73 between the stock frame 132 selected to be located in the exchange position and the supporting frame 72.

The stock frame 132 is further provided with a releasing mechanism 134 which releases or detaches each of the upper and lower roller units 133 off from each of the guide rails 8a by narrowing the distance between the upper and lower roller units 133, 133. In this manner, by releasing the engagement between the guide rails 8a and the roller units 133, another jig 8 can be placed onto the stock frame 132. The releasing mechanism 134 is each made up of: a pair of upper and lower slide plates 134b, 134b which are supported by rails 134a fixed to the stock frame 132; and a cylinder 134d which moves both the slide plates 134b, 134b through a toggle link 134c toward, and away from, each other. The upper and lower roller units 133, 133 are respectively mounted on both the slide plates 134b, 134b. By the movements of both the slide plates 134b, 134b toward each other, the distance between the upper and lower roller units 133, 133 can be narrowed.

The base 130 is further provided with a transporting mechanism 135 which longitudinally transports the jig 8 between the stock frame 132 in the exchanging position and the supporting frame 72. The transporting mechanism 135 has a hook 135c on a travelling body 135b which is supported in a longitudinally movable manner on a guide rail 135a on the supporting base 130. The hook 135c which is engageable with an engaging portion 8d extending down on a front end of the jig 8 can be erected and laid down by a cylinder 135d. The travelling body 135b has mounted thereon an electric motor 135g which has that sprocket 135f on an output shaft which is meshed with a chain 135e fixed to the base 130. The travelling body 135b can thus be self-propelled along the guide rail 135a by means of the electric motor 135g.

The rotary member 131 is provided: on a front end thereof with a pair of stoppers 136, 136 in a manner to correspond to the pair of stock frames 132, 132; and on a rear end thereof with a pair of clamping members 137, 137 which are opened and closed by cylinders 137a, 137a. The jig 8 to be supported by each of the stock frames 132 can thus be held by the respective clamping members 137, 137 between each of the stoppers 136, 136.

In exchanging the jig, the following steps are taken. Namely, the supporting base 7 is moved to the shunted position. After unclamping the clamping members 77, the supporting frame 72 is moved laterally inward away from the upper frame 70. Vertically and laterally positioning engaging members 8b, 8c are thus released from the corresponding positioning members 74, 75. Also, the travelling body 135b is moved backward and the hook 135c is erected, whereby the hook 135c is engaged with the engaging portion 8d of the used (or finished) jig 8 which is supported by the supporting frame 72. Thereafter, the travelling body 135b is moved forward to thereby transfer the used jig 8 from the supporting frame 72 to one stock frame 132 which is in the exchanging position. When this exchanging has been finished, the clamp member 137 of the above-described one stock frame 132 is closed and also the hook 135c is laid down. Then, the rotary member 131 is rotated to select into the exchanging position the other stock frame 132 which keeps on supporting the jig 8 for the next kind of the vehicle. Then, the hook 135c is erected to thereby engage the hook 135c with the engaging portion 8d of the jig 8 which is supported on the other stock frame 132. Also, the clamp member 137 for the other stock frame 132 is opened. Thereafter, the travelling body 135b is moved backward to transfer the jig 8 for the next kind of the vehicle from the other stock frame 132 to the supporting frame 72. Then, the supporting fame 72 is pulled toward the upper frame 70, and also the jig 8 is clamped by the clamping members 77. The jig exchanging is thus finished. After the exchanging of the jig has been finished, the travelling body 135b is moved forward in a state in which the hook 135c is laid down and is kept in this position until the next jig exchanging.

In the above-described embodiment, the stock frame 132 is provided on two faces in the periphery of the rotary member 131. It is also possible to form the rotary member 131 in a columnar shape of triangle or square in cross section so that three or more stock frames 132 are provided in the periphery of the rotary member 131.

Further, in the above-described embodiment, the welding robots 112 for welding the upper portion of the vehicle body are mounted on the upper frame 70 on the supporting base 7. However, the following arrangement may also be employed. Namely, a stationary frame is disposed at an upper portion of each lateral side of the vehicle body assembly station ST2. A plurality of welding robots are suspended from these stationary frames to perform the welding of the upper portion of the vehicle body by these welding robots.

Still furthermore, in the above-described embodiment, the present invention was applied to the assembly of the vehicle body which is provided with a rear tray W4 as a rear cross member which is disposed laterally in the rear portion of the vehicle body. The present invention can also be applied to the assembly of the vehicle in which, as a rear cross member, a rear roof rail is provided like in a hatchback type of vehicle.

It is readily apparent that the above-described apparatus for assembling a vehicle body meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a vehicle body comprising:
    a setting cart movable back and forth between a setting station and a vehicle body assembly station;
    a jig mounted on a supporting base in a posture to look laterally inward, said supporting base being disposed on each laterally outside portion of the vehicle body assembly station;
    said setting cart having: floor panel supporting members for positioning and supporting a floor panel of the vehicle body; side sill receiving members for receiving side sill portions which are defined as combined portions between the floor panel and left and right side panels; and side panel forcing members for forcing each of the side panels from a lateral outside toward the floor panel;
    wherein the floor panel and both the side panels are set onto said setting cart in the setting station and are transported to the vehicle body assembly station, wherein each of the side panels is received in the vehicle body assembly station in a state of being combined with the floor panel by each of said jigs and wherein, in this state, each of the side panels is combined by welding to the floor panel to thereby assemble the vehicle body;
    a plurality of welding robots for combining by welding each of the side panels to the floor panel, said welding robots being disposed on each of the lateral sides of the vehicle body assembly station at a level below each of said jigs;
    wherein said side sill receiving members and said side panel forcing members are disposed on said setting cart so as to be retractable into shunted positions free from interference with said welding robots in welding operation.

2. The apparatus according to claim 1, further comprising on each of the lateral sides of said vehicle body assembly station:
    a longitudinally elongated stationary frame positioned at a level below each of said jigs, said welding robots being mounted on said stationary frame so as to be movable back and forth;
    a supporting base formed into a T-configuration in which a longitudinal length of a lower portion thereof is smaller than a longitudinal length of an upper portion thereof for mounting thereon said jig, such that an open space which extends to said stationary frame is secured in a front and a rear at a lower portion of said supporting base.

3. The apparatus according to claim 1, wherein, in addition to the floor panel and the left and right side panels, a roof panel of the vehicle body and a rear cross member to be laterally mounted on a rear portion of the vehicle body are set in position on said setting cart in the setting station, said apparatus further comprising:
    a first setting robot made up of an articulated type of robot disposed on each of the lateral sides of the setting station to thereby set in position each of the side panels onto said setting cart by said first setting robot;
    a second setting robot made up of an articulated type of robot disposed on an outside of one of the lateral sides at a rear end of the vehicle body in the setting station;
    a roof panel holding device mounted on an operating end of said second setting robot;
    a rear cross member holding device mounted on a backside of said roof panel holding device at that front end of said roof panel holding device which lies near a front end of the roof panel such that a lower surface of the rear cross member looks forward of the roof panel;
    wherein the rear cross member is set in that erected posture of said roof panel holding device in which said rear cross member holding device looks downward and wherein the roof panel is set in a horizontal posture of said roof panel holding device.

4. The apparatus according to claim 1, further comprising:
    a supporting frame provided on said supporting base such that said jig is movable back and forth in an inward-looking posture;
    a jig replacing device disposed adjacent to one of the longitudinal sides of said supporting base, said jig replacing device having a rotary member which is rotatable about a longitudinal axis;

a plurality of stock frames disposed in a periphery of said rotary member, said stock frames each supporting said jig so as to be movable back and forth, wherein, by the rotation of said rotary member, an arbitrary one of said stock frames is selected to be in an exchanging position which longitudinally aligns with said supporting frame, wherein said jig is replaceable in the inward-looking posture between said supporting frame and said stock frame selected in the replacing position.

5. The apparatus according to claim 4, further comprising:

a pair of longitudinally elongated upper and lower guide rails fixed to a backside of said jig, said guide rails lying vertically opposite to each other when said jig is in the inward-looking posture;

upper and lower guide members provided on each of said supporting frames and said stock frames such that said pair of upper and lower guide rails of said jig are engaged in a manner movable back and forth; and a releasing mechanism provided on each of said stock frames for releasing each of said guide members off from each of said guide rails by narrowing a distance between said upper and lower guide members.

* * * * *